US011808206B2

(12) United States Patent
Callahan

(10) Patent No.: US 11,808,206 B2
(45) Date of Patent: Nov. 7, 2023

(54) TAIL GAS RECYCLE COMBINED CYCLE POWER PLANT

(71) Applicant: Richard Alan Callahan, Isle La Motte, VT (US)

(72) Inventor: Richard Alan Callahan, Isle La Motte, VT (US)

( * ) Notice: Subject to any disclaimer, the term of this patent is extended or adjusted under 35 U.S.C. 154(b) by 0 days.

(21) Appl. No.: 17/679,916

(22) Filed: Feb. 24, 2022

(65) Prior Publication Data

US 2023/0265794 A1 Aug. 24, 2023

(51) Int. Cl.
  *F02C 6/18* (2006.01)
  *F02C 3/34* (2006.01)
  *F02C 3/20* (2006.01)
  *F02C 3/22* (2006.01)
  *F01K 23/10* (2006.01)

(52) U.S. Cl.
  CPC .............. *F02C 6/18* (2013.01); *F02C 3/20* (2013.01); *F02C 3/34* (2013.01); *F01K 23/10* (2013.01); *F02C 3/22* (2013.01)

(58) Field of Classification Search
  CPC ...... F02C 6/18; F02C 3/20; F02C 3/22; F02C 3/34; F01K 23/10
  See application file for complete search history.

(56) References Cited

U.S. PATENT DOCUMENTS

| 2,548,377 A | 4/1951 | Kapitza |
| 3,479,298 A | 11/1969 | Sze et al. |
| 4,083,945 A | 4/1978 | Fenton et al. |
| 4,085,199 A | 4/1978 | Singleton et al. |
| 4,094,746 A | 6/1978 | Masciantonio et al. |
| 4,345,925 A | 8/1982 | Cheung |
| 4,382,366 A | 5/1983 | Gaumer |
| 4,415,484 A | 11/1983 | Setzer et al. |
| 4,531,371 A | 7/1985 | Voronin et al. |
| 4,533,375 A | 8/1985 | Erickson |
| 4,602,477 A | 7/1986 | Lucadamo |
| 4,836,833 A | 6/1989 | Nicholas et al. |
| 5,628,931 A | 5/1997 | Lednor et al. |
| 5,653,774 A | 8/1997 | Bhattacharyya et al. |
| 5,700,438 A | 12/1997 | Miller |
| 6,043,288 A * | 3/2000 | DeGeorge ................ B01J 38/10 518/700 |
| 6,066,307 A * | 5/2000 | Keskar ................ B01D 53/228 423/652 |
| 6,340,437 B1 | 1/2002 | Yagi et al. |
| 6,389,814 B2 | 5/2002 | Viteri et al. |
| 6,997,971 B1 | 2/2006 | Young et al. |
| 7,481,856 B2 | 1/2009 | Docter et al. |
| 7,592,290 B2 | 9/2009 | Hussain et al. |

(Continued)

FOREIGN PATENT DOCUMENTS

| CN | 1713949 A | 12/2005 |
| CN | 102946981 A | 2/2013 |

(Continued)

OTHER PUBLICATIONS

E-Combustion Capture, CATF (Clean Air Task Force) article, 2019.

(Continued)

*Primary Examiner* — William H Rodriguez

(57) ABSTRACT

A process is provided for recycling Hydrogen enrichment tail gas to a combined cycle power system.

19 Claims, 4 Drawing Sheets

(56) References Cited

U.S. PATENT DOCUMENTS

| | | | |
|---|---|---|---|
| 7,691,182 B1 * | 4/2010 | Muradov | C10L 3/08 422/177 |
| 7,827,794 B1 | 11/2010 | Pronske et al. | |
| 7,909,898 B2 | 3/2011 | White et al. | |
| 7,950,529 B2 | 5/2011 | Kulkarni et al. | |
| 8,088,196 B2 | 1/2012 | White et al. | |
| 8,420,211 B2 | 4/2013 | Ohya et al. | |
| 8,541,517 B2 | 9/2013 | Klaehn et al. | |
| 8,596,075 B2 | 12/2013 | Allam et al. | |
| 8,715,379 B2 | 5/2014 | Briesch et al. | |
| 8,752,426 B2 | 6/2014 | Wimberger et al. | |
| 8,959,887 B2 | 2/2015 | Allam et al. | |
| 9,062,608 B2 | 6/2015 | Allam et al. | |
| 9,321,015 B2 | 4/2016 | Jayaweera et al. | |
| 9,726,375 B2 | 8/2017 | Stallman | |
| 9,776,863 B2 | 10/2017 | Iaquaniello et al. | |
| 9,782,718 B1 | 10/2017 | Baker et al. | |
| 9,812,723 B2 | 11/2017 | Ghezel-Ayagh | |
| 9,869,245 B2 | 1/2018 | Allam et al. | |
| 9,932,229 B2 | 4/2018 | Iaquaniello et al. | |
| 10,046,671 B2 | 8/2018 | Seiller | |
| 10,144,874 B2 | 12/2018 | Walter et al. | |
| 2004/0170557 A1 | 9/2004 | Asen | |
| 2012/0058921 A1 | 3/2012 | Van Den Berg | |
| 2012/0195824 A1 | 8/2012 | Van De Graaf et al. | |
| 2014/0251897 A1 | 9/2014 | Livingston et al. | |
| 2016/0375410 A1 | 12/2016 | Berchtold et al. | |
| 2017/0081477 A1 | 3/2017 | McGrath et al. | |
| 2018/0304193 A1 | 10/2018 | Al-Maythalony et al. | |
| 2020/0276535 A1 * | 9/2020 | Callahan | F02C 3/22 |
| 2020/0277895 A1 * | 9/2020 | Callahan | F02C 6/18 |
| 2021/0115848 A1 * | 4/2021 | Callahan | F02C 3/22 |

FOREIGN PATENT DOCUMENTS

| | | | | |
|---|---|---|---|---|
| CN | 205779064 U | 12/2016 | | |
| DE | 3855952 T2 | 2/1998 | | |
| JP | 01194925 A | 8/1989 | | |
| JP | 2000109859 A | 4/2000 | | |
| JP | 2003106164 A | 4/2003 | | |
| JP | 2007254270 A | 10/2007 | | |
| JP | 5242207 B2 | 7/2013 | | |
| JP | 2016522836 A | 8/2016 | | |
| WO | WO-2007092084 A2 * | 8/2007 | | C01B 3/501 |
| WO | WO2012045335 A1 | 4/2012 | | |
| WO | WO2018030356 A1 | 2/2018 | | |
| WO | WO2018043053 A1 | 3/2018 | | |

OTHER PUBLICATIONS

Air Products CRIEPI 1988 Test Facility, Figure 7.5 from Robert E. Kesting and A. K. Fritzsche, Polymeric Gas Separation Membranes, JohnWiley & Sons, Inc. (Dec. 1993).

Giovanni Lozza et al., "CO2 Capture from Natural Gas Combined Cycles", Article from ResearchGate, Jan. 2009.

Ube CO2 Separation Membranehttp, product bulletin obtained from ://www.ube.co.th/picture/file/CO2%20Separation%20Membrane.pdf.

A. Zogala,Equilibrium Simulations of Coal Gasification—Factors Affecting Syngas Composition, Journal of Sustainable Mining, 2014, e-Issn 2300-3960 | p-ISSN 2300-1364.

Indira S. Jayaweera, Development of Pre-Combustion CO2Capture Process Using High-Temperature Polybenzimidazole (PBI) Hollow-Fiber Membranes (HFMs), Aug. 2017.

Sonai Patel, Game-Changing supercritical CO2 Cycles are closer to Commercialization, Dec. 13, 2017, ConnectedPlant Conference, https://www.powermag.com/a.

Xijia Lu et al., Investigation of Low Rank Coal Gasification in aTwo-Stage Downdraft Entrained-Flow Gasifier, International Journal of Clean Coal and Energy, 2014, 3, 1-12.

S. Wong, CO2 capture: Pre-combustion and oxy-fuel technologies, Original text: S. Wong, APEC Capacity Building in the APEC Region, Phase II Revised and updated by CO2CRC.

F. Kasuya et al., Article in Gas Separation & Purification 5(4):242-246—Dec. 1991 with 295 Reads DOI: 10.1016/0950-4214(91)80031-Y.

J. -M. Amann et al.,Reforming Natural Gas for CO2 pre-combustion capture in Combined Cycle power plantArticle, Clean Technologies and Environmental Policy 11(1)67-76,Feb. 2009.

Syngas Composition,https://www.netl.doe.gov/research/coal/energy-systems/gasification/gasifipedia/syngascomposition.

Clarke Energy Syngas Newsletter, https://www.clark-energy.com/synthesis-gas-syngas.

David Wagman, This Power Plant Runs on CO2, Article, https://www.enggtalks.com/news/79876/this-power-plant-runs-on-co2, May 2018.

Ube Technical Bulletin, Ube Gas Separation System, by Polyimide Membrane, 1989.

Nikolic and Kikkeinides, Modelling and optimization of hybrid PSA/membrane separation processes, Apr. 9, 2015.

Disclosure to Air Products, IGCC with Low Temperature Membrane (LTM) Carbon Capture, Disclosure to Air Products Oct. 24, 2006, by Enerfes, Inc.

* cited by examiner

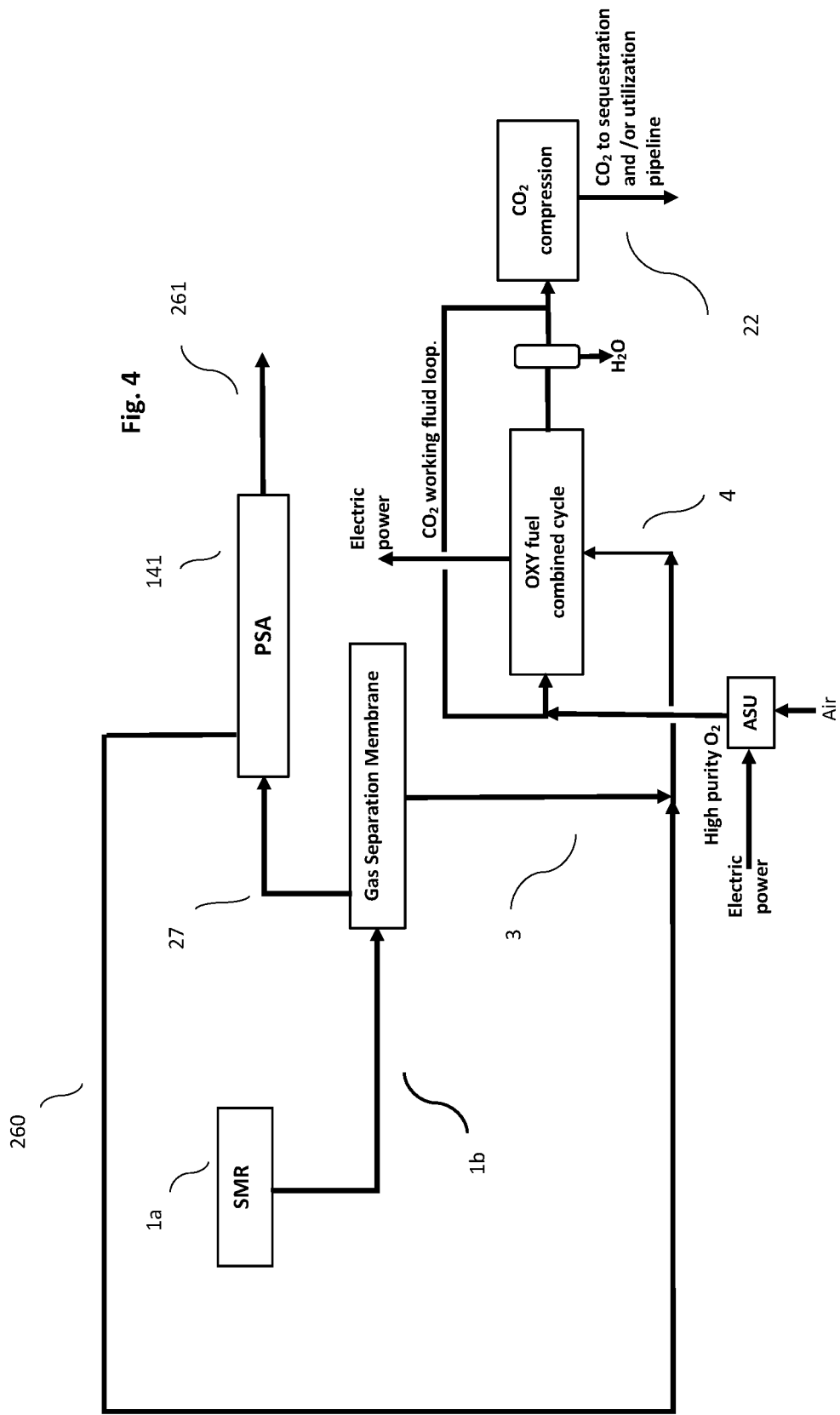

TAIL GAS RECYCLE COMBINED CYCLE POWER PLANT

BACKGROUND OF THE INVENTION

All patents, patent applications and other publications referred to herein are specifically incorporated herein by reference in their entirety.

Among its many known uses, synthesis gas (syngas) can be used as the fuel in gas turbine driven power plants. Synthesis gas (syngas) is a gas mixture comprising primarily hydrogen ($H_2$), carbon monoxide (CO), water ($H_2O$) and carbon dioxide ($CO_2$), with minor amounts of other compounds (e.g., nitrogen, argon, hydrogen sulfide and methane). It can be produced by a number of known methods, including but not limited to coal gasification, steam methane reforming (SMR) and autothermal reforming (ATR).

In a gas turbine syngas is fed as a fuel together with air. There are three main turbine components:
1. An upstream axial rotating gas compressor section;
2. A downstream turbine expansion section on a common shaft with the compressor;
3. A combustion chamber or area, called a combustor, in between 1. and 2. above.

Atmospheric air flows through the compressor that brings it to higher pressure. Fuel is mixed with the air in a combustor wherein it is ignited to produce high temperature working fluid. In the case of syngas as fuel, energy is added by spraying syngas into the air and igniting it. This high-temperature high-pressure working fluid enters a turbine where it expands down to an exhaust pressure, producing shaft work output in the process. The turbine shaft work is used to drive the compressor; the energy that is not used to drive the compressor exits in the exhaust gases to produce thrust (power). The purpose of the gas turbine determines the design so that the most desirable split of energy between the thrust and the shaft work is achieved.

In the steam methane reforming process, a mixture of water and hydrocarbon, typically natural gas, are contacted at a high temperature, for example, in the range of about 850° to about 900° C., and typically in the presence of a catalyst, to form a mixture of hydrogen and carbon monoxide. Using methane as the hydrocarbon, the theoretical stoichiometry for the steam reforming reaction is as follows:

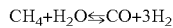

The primary purpose of the steam methane reforming process is to produce hydrogen. To increase the production of hydrogen, it is common practice to subject the hydrogen and carbon monoxide mixture to the water gas shift reaction (WGSR) as follows:

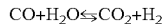

As illustrated in U.S. Pat. No. 9,782,718 and U.S. Pat. No. 3,965,675, a gas turbine can be combined with a steam turbine. In this "combined" system, hot exhaust from the gas turbine produces steam in a heat recovery steam generator for feeding as a working fluid to a steam turbine. In the combined system, each of the gas turbine and the steam turbine can be utilized to produce electricity.

Gas turbine power plants and combined gas turbine/steam turbine power plants known as combined cycle power plants (CC) can use the burning of fossil fuel to generate required heat. These systems have known drawbacks, for example harmful air emissions. Natural gas combined cycle power plants (NGCC) produce large quantities of pollutants, especially carbon dioxide. Coal fired integrated gasification combined cycle plants (IGCC) add sulfur oxides, mercury and fine particles. These drawbacks are typically addressed by adding expensive, energy-intensive equipment to reduce or clean up emissions after they are produced. However, the required systems degrade performance, reliability and increase the cost of electricity and the total cost of the power plant. They are expensive to build, complex and energy intensive.

For example, regarding IGCC coal-based plants, see "Commercial Power Production based on Gasification | netl . . . ", https://www.netl.doe.gov>energy-systems>gasification>gasifipedia>igcc, [Retrieved Sep. 22, 2019], National Energy Technology Laboratory (NETL), wherein it states, "Some important challenges to the widespread adoption of IGCC technology include cost, availability, and complexity. Cost is widely cited as the greatest barrier to IGCC acceptance. Capital costs for IGCC are high compared with alternative power plant designs, particularly NGCC, and financial viability is often dependent upon subsidies or tax credits. As a relatively new technology relative to pulverized coal power plants (PC) and NGCC, development and design costs are much higher for IGCC. Availability also impacts operating costs and must be high enough to compete favorably with the conventional alternatives. The complexity of IGCC relative to older, more established plant designs also increases operating costs and can impact availability and the generation of capital for plant development. These challenges to gasification, with a focus towards IGCC, are discussed in the introductory discussion about gasification." See also, "The Three Factors That Doomed Kemper County IGCC", spectrum.ieee.org/energy-wise/energy/fossil-fuels/ . . . Jun. 30, 2017, IEEE Spectrum, [Retrieved Sep. 22, 2019.

In light of the noted problems related to IGCC power plants, and with the advent of relatively cheap natural gas, power plant companies are turning to NGCC power plants. Since natural gas (NG) became readily available as fuel for gas turbines, it was fed directly to the combustion chamber. A non-limiting illustrative example of an NGCC power plant is schematically shown in FIG. 1.

With reference to FIG. 1, reference numeral 1 generally refers to a gas turbine generator for producing power. Gas turbine 1 comprises compression section 103, expansion section 102 and combustor section 104 shown therebetween. Air stream 106 is fed to compression section 103. Natural gas stream 105 is fed to combustor section 104 wherein it is combusted with compressed air stream 107 to produce gas turbine working fluid 108. Gas turbine working fluid 108 flows to expansion section 102 wherein the expanding working fluid produces power for operating compressor section 103 and an electricity generator 109. Gas turbine exhaust 110 flows to heat exchanger 111 wherein exhaust stream 110 is cooled by indirect heat exchange with circulating water stream 113. Cooled exhaust stream 110 is vented to the atmosphere in vent stream 112. Circulating water stream 113 is heated to produce steam stream 114. Steam stream 114 then flows to a steam turbine 115 that produces power to operate electricity generator 116. After expansion in steam turbine 115, stream 117 flows to condenser 118 wherein stream 117 is condensed to water. The water stream 17a exiting condenser 118 is then recycled to heat exchanger 111 by pump 119.

The present invention relates to a novel process for operating NGCC power plants. According to an embodiment, the process comprises:

a. feeding a separator feedstream comprising syngas from natural gas to membrane separator means, b. separating the separator feedstream in the separator means to form a first, CO— rich stream and a second, $H_2$-rich stream, c. feeding the first, CO-rich stream as an oxyfuel combustor feedstream to oxyfuel combustor means for forming sub-critical $CO_2$ gas turbine working fluid, and d. feeding the sub-critical $CO_2$ gas turbine working fluid to gas turbine means for producing power, e. wherein the sub-critical $CO_2$ gas turbine working fluid exits the gas turbine means as gas turbine exhaust which is fed to heat recovery steam generator means (HRSG) for generating steam, and wherein steam from the heat recovery steam generator means (HRSG) is fed as first steam working fluid to first steam turbine means for generating power, f. wherein a first portion of exhaust from the gas turbine is recycled to the oxyfuel combustor means together with high purity oxygen and the CO-rich stream, g. wherein the second, $H_2$-rich stream is fed as a $H_2$ feedstream to hydrogen enrichment means to form an enriched $H_2$ stream and a tail gas stream, and h. wherein the tail gas stream is fed as tail gas recycle to the oxyfuel combustor feedstream.

It is common practice when operating hydrogen enrichment means, by way of non-limiting illustrative example pressure swing adsorption (PSA), to form an enriched $H_2$ stream and a tail gas stream. These hydrogen enrichment processes typically feed tail gas as fuel, for example, to a steam methane reformer when used, or make use of an additional process to treat the tail gas with an adsorbent in an additional PSA unit or an absorbent such as dimethylethanolamine to remove $CO_2$ therefrom. By combining the tail gas recycle stream with the retentate CO-rich stream in accordance with the present invention, it is possible to form an oxyfuel combined cycle power plant that accomplishes minimal or even near zero carbon emission hydrogen production. This carbon emission result is enabled without the need to add an additional process.

According to another embodiment, the process comprises:

a. feeding a separator feedstream comprising syngas from natural gas to separator means, b. separating the separator feedstream in the separator means to form a first, CO-rich stream and a second, $H_2$-rich stream, c. feeding the first, CO-rich stream as an oxyfuel combustor feedstream to oxyfuel combustor means for forming sub-critical $CO_2$ gas turbine working fluid, d. feeding the sub-critical $CO_2$ gas turbine working fluid to sub-critical $CO_2$ gas turbine means, the sub-critical $CO_2$ gas turbine means having a sub-critical $CO_2$ gas turbine expansion section and a sub-critical $CO_2$ gas turbine compression section, the sub-critical $CO_2$ gas turbine working fluid being fed to the sub-critical $CO_2$ gas turbine expansion section for producing power, e. recycling at least a first portion of exhaust from the sub-critical $CO_2$ gas turbine expansion section to the sub-critical $CO_2$ gas turbine compression section of the sub-critical $CO_2$ gas turbine means, wherein the power produced in step (d) is used to power the sub-critical $CO_2$ gas turbine compression section to compress the recycled sub-critical $CO_2$ gas turbine exhaust, f. capturing the remaining portion of sub-critical $CO_2$ gas turbine exhaust, g. feeding the compressed sub-critical $CO_2$ gas turbine exhaust to the oxyfuel combustor means, h. reacting the first, CO-rich stream with high purity oxygen in the oxyfuel combustor means under sub-critical $CO_2$ conditions, i. wherein the second, $H_2$-rich stream is fed as a $H_2$ feedstream to hydrogen enrichment means to form an enriched $H_2$ stream and a tail gas stream, and, j. wherein the tail gas stream is fed as tail gas recycle to the oxyfuel combustor feedstream.

BRIEF DESCRIPTION OF THE DRAWINGS

FIG. 4 is a block diagram according to a further embodiment for material balance purposes.

DETAILED DESCRIPTION OF THE INVENTION

Figure 1:
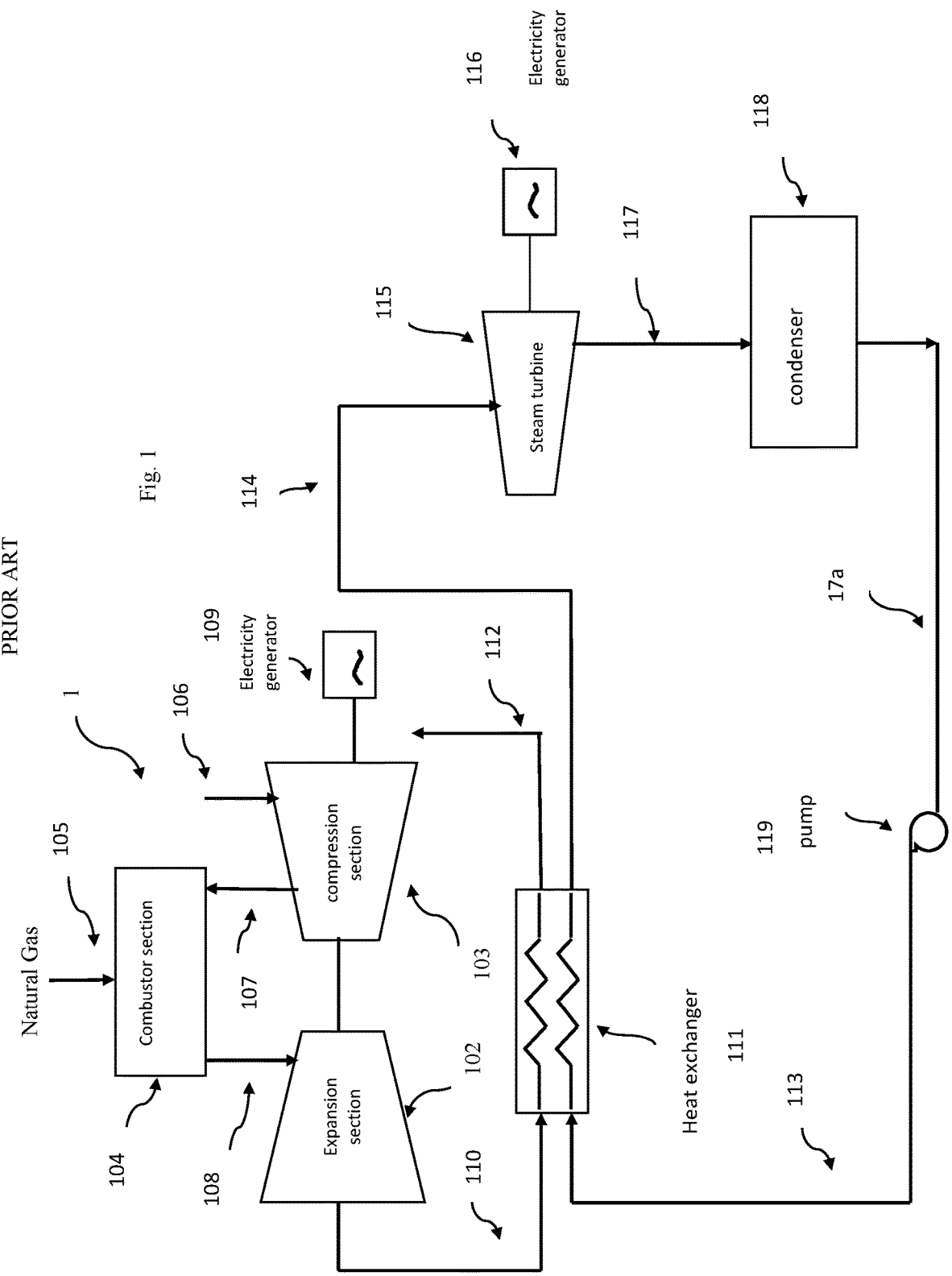
FIG. 1 is a schematic diagram of a conventional al NGCC power plant using natural gas as the combustor fuel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

All publications, patents and patent applications cited herein, whether supra or infra, are hereby incorporated herein by reference in their entirety to the same extent as if each individual publication, patent or patent application was specifically and individually indicated to be incorporated herein by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, as well as, any range formed within a specified range, regardless of whether ranges are separately disclosed. Where a range of numerical values is recited herein, unless otherwise stated, the range is intended to include the endpoints thereof, and all integers and fractions within the range. For example, recitation of 1-5 is intended to include all integers including and between 1 and 5 and all fractions and decimals between 1 and 5, e.g., 1, 1.1, 1.2, 1.3 etc. It is not intended that the scope of the invention be limited to the specific values recited when defining a specific range. Similarly, recitation of at least about or up to about a number is intended to include that number and all integers, fractions and decimals greater than or up to that number as indicated. For example, at least 5 is intended to include 5 and all fractions and decimals above 5, e.g., 5.1, 5.2, 5.3 etc.

It is noted that, as used in this specification and the appended claims, the singular forms "a," "an" and "the" include plural referents unless the content clearly dictates otherwise. Unless otherwise expressly indicated herein, all amounts are based on volume.

Figure 2:
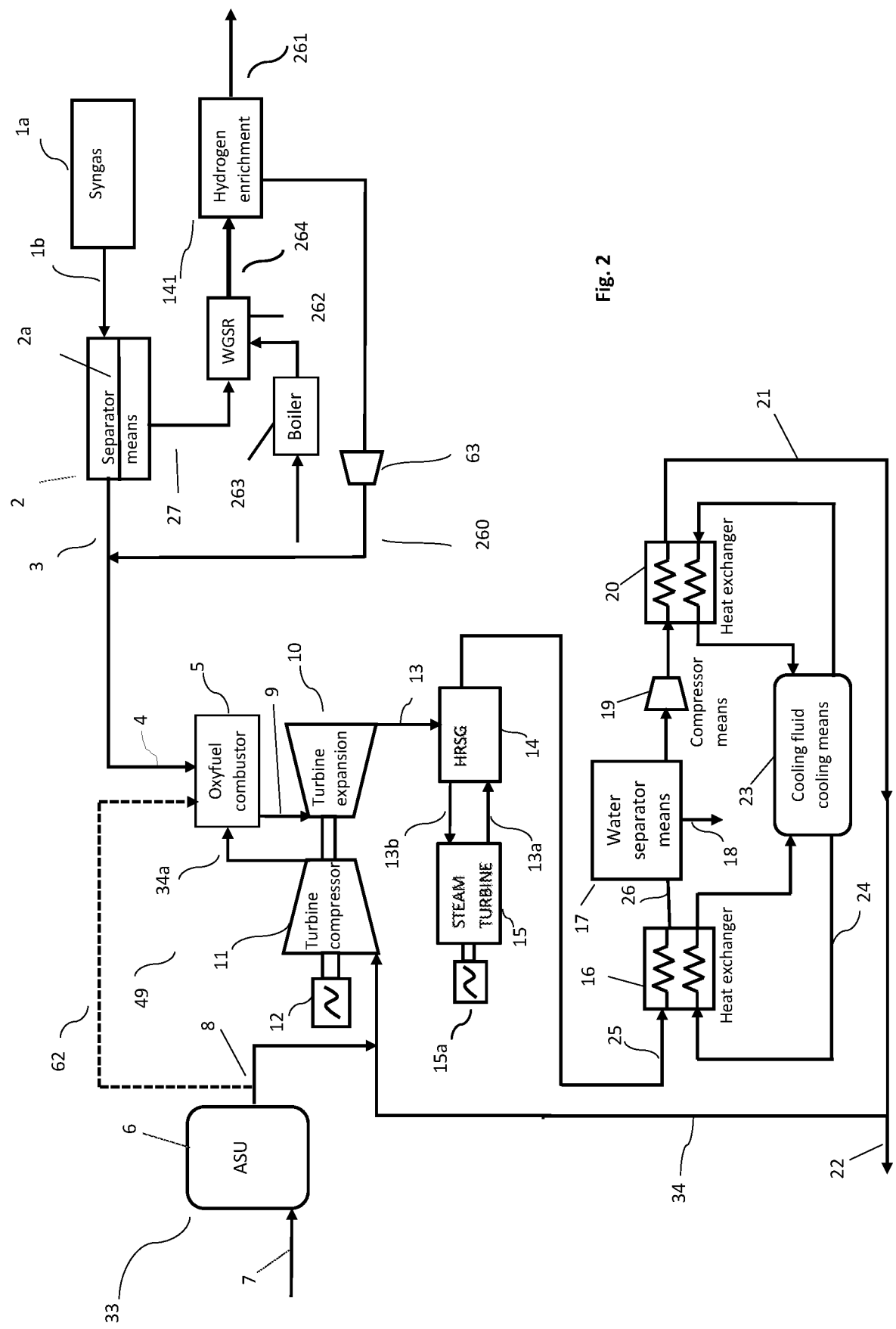
FIG. 2 is a schematic diagram of a NGCC power plant using separated syngas as fuel for a combined cycle power plant according to an embodiment.

With reference to illustrative FIG. 2 of the drawings, 1a is a process for converting natural gas to syngas, for example, by steam methane reforming (SMR), partial oxidation, or autothermal reforming (ATR). See, for example, U.S. Pat. No. 3,479,298, U.S. Pat. No. 5,653,774, U.S. Pat. No. 6,340,437, U.S. Pat. No. 7,481,856, U.S. Pat. No.

4,415,484, U.S. Pat. No. 7,592,290 and U.S. Pat. No. 5,628,931. Steam reforming of natural gas can proceed in tubular reactors that are heated externally. The process uses nickel catalyst on a special support that is resistant against the harsh process conditions. Waste heat from the heating section is used to preheat gases and to produce steam. Partial oxidation of methane is a non-catalytic, large-scale process to make syngas. A catalytic version of partial oxidation (CPO), based on short-contact time conversion of methane, on e.g. rhodium catalysts, is suitable for small-scale applications. Autothermal reforming (ATR) is a hybrid, which combines methane steam reforming and oxidation in one process. Since steam reforming is endothermic the heat needed for reforming is generated inside the reactor by oxidation of a portion of the feed gas as fuel. In accordance with an embodiment, the syngas is not subjected to a water gas shift reaction, that is the syngas feed 1b is unshifted (water gas shifted free).

There are two advantages with membrane separation of carbon as carbon monoxide from unshifted syngas. When feeding unshifted syngas 1b from 1a to membrane separator means 2, membrane selectivity for $H_2/CO$ is substantially higher than $H_2/CO_2$. In simulations conducted on commercial membranes provided by commercial membrane manufacturers Generon and Ube Industries, Ltd., the Generon membrane, showed a $H_2/CO$ selectivity of 38.7 and $H_2/CO_2$ selectivity of 2.5 while an Ube membrane, showed a $H_2/CO$ selectivity of 27.7 and a $H_2/CO_2$ selectivity of 3.2.

Second, in simulations the Generon membrane optimized for $H_2$ production captured 90.42% of the CO in the retentate along with 8.20% of the $H_2$ and recovered 91.80% of the $H_2$ in the permeate along with 9.58% of the CO. According to an embodiment, the captured CO in the retentate is directed to the oxyfuel combined cycle wherein it is captured as high purity $CO_2$ in the exhaust stream. According to simulations, permeate which is directed to $H_2$ production contains 9.58% of the CO and needs substantially less steam (energy penalty) and capital equipment (cost penalty) in a WGSR to convert the CO to $CO_2$. Thus, the WGSR energy and capital cost penalties can be reduced by over 90% by separating CO and $H_2$ in unshifted syngas.

Syngas feed compositions are well known in the art and can vary depending on the source. By way of nonlimiting example, it is believed that syngas feed 1b can comprise $H_2$, $CO_2$, CO, $CH_4$ and $H_2O$ in the following amounts. The $H_2$ content can be about 20-80. The $CO_2$ content can be about 2-25%. The CO content can be about 20-60%. The $H_2O$ content can be up to 20%. The $CH_4$ content can typically be about 0.1%-2.0%. It is understood that the syngas feed 1b may contain minor amounts of contaminants, e.g., $H_2S$, $NH_3$, HCl, COS, and Hg, depending on whether the syngas is from gasified coal or reformed natural gas, and can be removed by known treatments. By way of example, contaminants could comprise less than about 0.5% of syngas feed 1b.

Separator means 2 can be any known separator means suitable for the purpose of separating the syngas feed stream into a first, CO-rich stream 3 and a second, $H_2$-rich stream 27. For example, separator means can be membrane separator means or pressure swing adsorption means. Membrane separation is preferred.

Gas separation membranes and the operation thereof for separating gas mixtures are well known. See for example, U.S. Pat. No. 5,482,539. U.S. Pat. No. 4,990,168, U.S. Pat. No. 4,639,257, U.S. Pat. No. 2,966,235, U.S. Pat. No. 4,130,403, U.S. Pat. No. 4,264,338, and U.S. Pat. No. 5,102,432. Any known membrane that is operable under the conditions of operation to meet the noted product compositions can be used. For example, Ube membranes and Generon® membranes advertised for $H_2$ separations would be suitable, as would a polybenzimidazole (PBI) membrane. Reference is made, respectively, to Haruhiko Ohya et al, "Polyimide Membranes: Applications, Fabrications and Properties" by H. Ohya, V. V. Kudryavtsev and S. I, Semenova (Jan. 30, 1997) co-published by Kodansha LYD., 12-21 Otowa 2-Chome Bunkyo-Ku, Tokyo 112, Japan and Gordan and Breach Science Publishers S. A. Emmaplein 5, 1075 AW Amsterdam, The Netherlands, for the Ube membranes and to Jayaweera, Indira S. "Development of Pre-Combustion $CO_2$ Capture Process Using High-Temperature Polybenzimidazole (PBI) Hollow-Fiber Membranes (HFMs)", 2017 NETL $CO_2$ Capture Technology Project Review Meeting, Aug. 21-25, 2017, [online] [retrieved Jan. 17, 2019], [https://www.netl.doe.gov/sites/default/files/2017-12/2I-S-Jayaweera2-SRI-PBIHollow-Fiber-Membranes.pdf], and "Celazole® PBI", [online] [retrieved Jan. 17, 2019], [https://pbipolymer.com/markets/membrane/].

As illustrated in FIG. 2, separator means 2 comprises membrane means 2a disposed therewithin. The syngas feedstream is fed to separator means on one side of the membrane means and is separated into separate streams by selective permeation of syngas components therethrough. As shown, the membrane is more permeable to the $H_2$ contained in the syngas feed stream than it is to CO. The membrane being more selective for $H_2$ permeation, permeate stream 27 is enriched in $H_2$ as compared to syngas feed stream 1b, and retentate stream 3 is enriched in CO as compared to the syngas feed stream 1b. Accordingly, stream 27 comprises a Hz-rich stream and stream 3 comprises a CO-rich stream. The CO-rich stream is then sent to a sub-critical $CO_2$ power plant 33.

Concepts of mixed-gas separation, gas permeability and selectivity are discussed in a number of publications, including "Materials Science of Membranes for Gas and Vapor Separation", Edited by Yampolski et al, 2006 JohnWiley & Sons; "Pure and mixed gas $CH_4$ and $n-C_4H_{10}$ permeability and diffusivity in poly(1-trimethylsilyl-1-propyne)" Roy D. Raharjo et al, Polymer 48 (2007) 7329-7344, 2006 Elsevier Ltd., "Carbon Dioxide Separation through Polymeric Membrane Systems for Flue Gas Applications", Colin A. Scholes et al, Cooperative Research Centre for Greenhouse Gas Technologies, Department of Chemical and Biomolecular Engineering, The University of Melbourne, VIC, 3010, Australia; and "Recent Patents on Chemical Engineering", 2008, 1 52-66, 2008 Bentham Science Publishers Ltd.

The CO-rich stream 3 comprises primarily CO, with minor amounts of carbon dioxide and hydrogen.

After optional contaminant removal (not shown), stream 3 should comprise primarily CO and hydrogen. Stream 3 can also comprise a small amount of $CO_2$ and traces of remaining contaminants. For example, stream 3 can comprise at least about 35%, or at least about 50%, or at least about 65%, or at least about 80% CO. Having the benefit of the disclosure of the present invention, it is seen that the $H_2$ content of stream 3 depends on operational and plant design objectives. On that basis, it is believed that the stream 3 should comprise less than about 55%, or less than about 40%, or less than about 25%, or less than about 10% $H_2$. Stream 3 can also comprise a small amount of $CO_2$ and traces of remaining contaminants. Stream 3 should comprise less than about 0.01%, or less than about 0.001%, or less than about 0.0001%, or less than about 0.00001% of contaminants; and $CO_2$ should comprise less than about 25%, or less than about 15%, or less than about 10%, or less than about 5% of stream 3. Any upper limit for the CO content of stream 3 is considered to be limited only by the ability of technology to economically enrich stream 3 in CO. It is believed that using present technology, stream 3 can comprise up to 90-95% CO.

Stream 3 is then fed as oxyfuel combustor feed stream 4 to oxyfuel combustor means 5, wherein it is combined and reacted with high purity oxygen stream 8 of at least about 95% purity from air separation unit means 6 for separating oxygen from air and recycled $CO_2$ stream 34. Following compression in gas turbine compressor section 11 the oxygen $CO_2$ gas mixture as shown at 34a is fed to oxyfuel combustor means 5. As shown in FIG. 2, stream 4 is fed directly (other than any optional contaminant removal) to oxyfuel combustor means 5. For example, stream 4 is fed to the oxyfuel combustor means 5 in FIG. 2 in the absence of any intervening process step, e.g., expansion to lower pressure in an expander or compression in a compressor to increase pressure. The oxygen content of stream 8 comprises at least about 95%, at least about 97%, at least about 99%, or at least about 99.5% purity. As discussed in detail below, sub-critical $CO_2$ exhaust stream 34 after compression in turbine compressor 11 is also fed to combustor means 5. Oxygen stream 8 can be premixed with sub-critical $CO_2$ exhaust stream 34 either upstream of compression section 11 or in situ within combustor means 5 (shown at 62 in FIG. 2). Means for premixing in situ are known in the art. For example, see Delimont, Jacob et al, "Direct Fired Oxy-Fuel Combustor for sCO$_2$ Power Cycles, February 2018 Oxy-fuel Working Group presentation, [online] [retrieved Aug. 13, 2019], [https://www.netl.doe.gov/sites/default/files/netl-file/sCO2-WorkingGroup-Feb2018_1MWOxyCombustor.pdf].

Air separation units are well known, for example, as illustrated in U.S. Pat. No. 2,548,377, U.S. Pat. No. 4,531,371 and U.S. Pat. No. 4,382,366. See also, Rong Jiang, Analysis and Optimization of ASU for Oxyfuel Combustion [online] [retrieved Feb. 19, 2019] [http://ieaghg.org/docs/General_Docs/5oxy%20presentations/Session%207B/7B-05%20-%20R.%20Jiang%20(SASPG%20Ltd.).pdf], and "History and progress in the course of time, [online] [retrieved Feb. 19, 2019] [https://www.linde-engineering.com/en/images/Air_separation_plants_History_and_progress_in_the_course_of_time_tcm19-457349.pdf]. Before the use of a separator means to separate hydrogen from the syngas feed stream 1b in accordance with the present invention, a considerable portion of the oxygen produced in prior air separation units was consumed by reaction with $H_2$ contained in the combustor fuel stream 4. Combustion in accordance with an embodiment of the present invention, results in stream 9 comprised primarily of $CO_2$ working fluid with a substantially reduced amount of steam. The $CO_2$ content of the oxyfuel combustion exhaust in stream 9 will, of course, vary, depending on the amount of $H_2$ recovery in the membrane permeate and the amount of $CO_2$ in the membrane feed stream both of which affects the $CO_2$ content in the $CO_2$ oxyfuel combustion exhaust. In any event, it can comprise at least about 50%, at least about 60% at least about 70%, at least about 80% or at least about 90% $CO_2$, with the balance comprising $H_2O$, and contaminants such as $N_2$+Ar.

Sub-critical $CO_2$ stream 9 formed in combustor means 5 is then fed to the expansion section 10 of sub-critical $CO_2$ turbine means wherein power is produced to power compression section 11 and electricity generator 12. Expanded sub-critical $CO_2$ exhaust 13 is then fed to known heat recovery steam generator means (HRSG) 14, wherein exhaust 13 indirectly heats a water stream (not shown) to produce working fluid steam stream 13b. The working fluid steam stream 13b is fed to a first, known steam turbine means 15 that powers electricity generator 15a. Condensed steam stream 13a is recycled back to the HRSG 14.

Sub-critical $CO_2$ exhaust 25 from HRSG 14 is then fed to heat exchanger cooling means 16 for indirect cooling with cooling fluid 24. Cooled sub-critical $CO_2$ stream 26 is sent to condensed water separator means 17 for removing condensed water 18 from cooled sub-critical $CO_2$ stream 26. Since stream 26 comprises less water due to the separation of hydrogen from stream 1b by separator means 2, cooling means 23 energy and equipment size requirements can be significantly reduced. Cooling fluid 24 for heat exchangers 16 and 20 is provided by known cooling fluid cooling means 23. The sub-critical $CO_2$ working fluid leaving the water separator 17, is compressed in $CO_2$ compressor means 19, and then cooled in aftercooler heat exchanger means 20 to remove heat of compression. Compressed and cooled sub-critical $CO_2$ stream 21 is then circulated for at least partial capture in stream 22 and recirculation in stream 34 and then forwarded back to oxyfuel combustor means 5. As shown in FIG. 2, at least a first portion 34 of recycle stream 21 is recycled to oxyfuel combustor means 5. The remaining portion 22 of the recycle stream is captured for storage or further use, for example, in enhanced oil recovery. Recycle stream 34 is a working fluid for the optimum performance of the sub-critical $CO_2$ oxyfuel combustor 5 and the sub-critical $CO_2$ combustion turbine shown at 10 and 11. Recycling the sub-critical $CO_2$ to oxyfuel combustor means 5 enables the sub-critical $CO_2$ power cycle to operate with sub-critical CO2 as the working fluid in the gas turbine. The cycle is operated below the critical point of CO2.

Stream 27 comprises primarily $H_2$ with small quantities of $CO_2$, CO and trace quantities of $H_2O$. Stream 27 can comprise at least about 40%, or at least about 50% $H_2$ or at least about 60%, or at least about 85% $H_2$. Having the benefit of the disclosure of the present invention, it is seen that the CO content of stream 27 depends on operational and plant design objectives. On that basis, it is believed that stream 27 should comprise less than about 10% CO, or less than about 5% CO, or less than about 3% CO, or less than about 1% CO with the balance comprising other components such as $CO_2$ and $H_2O$. Any upper limit for the $H_2$ content of stream 27 is limited only by the ability of technology to economically enrich stream 27 in $H_2$. It is believed that using present technology, stream 27 can comprise up to about 90-95% $H_2$.

$H_2$-rich gas stream 27 is fed to any known process, for example, pressure swing adsorption or palladium proton membrane treatment, for further enrichment to high purity $H_2$ and further use. Any $H_2$ enrichment process that produces at least an enriched $H_2$ product stream, and a byproduct/tail gas stream would be suitable. Pressure swing adsorption (PSA) is preferred. By way of non-limiting example, the high purity $H_2$ can be used for 1. Zero emission transportation fuel in an internal combustion engine or in a fuel cell to power an electric motor,
2. Gas welding,
3. Hydrotreating to remove sulfur in petroleum refining,
4. Chemicals production,
5. Generation of electricity,
6. As a reducing agent,
7. Potentiometry and Chemical analysis,
8. In gas chromatography, or
9. Rocket fuel for space programs As shown in FIG. 2, permeate $H_2$-rich stream 27 is fed as a $H_2$ feed stream to hydrogen enrichment means 141 wherein an enriched $H_2$ stream 261 and a tail gas recycle stream 260 are formed. The tail gas stream 260 typically comprises CO, $CO_2$, $H_2$ and possibly a minor amount of $CH_4$. Stream 260 can comprise less than about 25%, less than about, 20%, less than about 10% or less than about 5% $CO_2$. Tail gas recycle stream 260 is fed to the retentate CO-rich stream 3 from separator 2. If necessary to increase the pressure of tail gas recycle stream 260, optional compressor 63 is provided. PSA processes typically feed tail gas as fuel, for example, to a steam methane reformer when used, or make use of an additional process to treat the tail gas with an adsorbent in an additional PSA unit or an absorbent such as dimethylethanolamine to remove $CO_2$ therefrom. By combining the tail gas recycle stream 260 with the retentate CO-rich stream 3 in accordance with the present invention, it is possible to form an oxyfuel gas turbine fuel 4 that can accomplish minimal or even near zero carbon emission hydrogen. This result is enabled without the need to add an additional process.

There are certain instances in which the industry specifications for hydrogen products require very low amounts of CO. For example, the U.S. Department of Energy issued the following Hydrogen Fuel Quality Specifications for Polymer Electrolyte Fuel Cells in Road Vehicles:
Hydrogen Fuel Quality Specifications for Polymer Electrolyte Fuel Cells in Road Vehicles (energy.gov)

additional process step is that less CO and higher hydrogen concentration is fed to the hydrogen enrichment step, e.g., the pressure swing adsorption unit which allows for a significant size reduction of the pressure swing adsorption unit.

A preferred additional process step is the well-known water gas shift reaction as follows:

$$CO+H_2O \leftrightarrows CO_2+H_2$$

Using this additional process step, it is believed that CO levels in the hydrogen product 261 can be less than about 6 ppm, or less than about 3 ppm, or less than 1 ppm, or less than about 0.210 ppm, or less than about 0.205 ppm, or less than 0.200 ppm, or even 0.153 ppm or less.

As shown in FIG. 2, permeate $H_2$-rich stream 27 is fed as a $H_2$ feed stream to a water gas shift reactor (WGSR) 262 to convert residual permeate CO to $CO_2$ and generate additional hydrogen in shifted stream 264. Steam generated in Boiler 263 is fed to the WGSR to effect the reaction. Hydrogen enrichment means 141 forms an enriched $H_2$ stream 261 and a tail gas recycle stream 260. The tail gas stream 260 typically comprises $H_2$, $CO_2$, and CO and

TABLE 1-1

Directory of limiting characteristics (maximum allowable limits of contaminants) from ISO FDIS 14687-2

| Characteristics (assay) Type I, Type II Grade | |
|---|---|
| Hydrogen fuel index (minimum mole fraction) [a] | 99.97% |
| Total non-hydrogen gases | 300 μmol/mol |
| Maximum concentration of individual contaminants | |
| Water ($H_2O$) | 5 μmol/mol (5.0 ppm) |
| Total hydrocarbons b (Methane basis) | 2 μmol/mol (2.0 ppm) |
| Oxygen ($O_2$) | 5 μmol/mol (5.0 ppm) |
| Helium (He) | 300 μmol/mol (300 ppm) |
| Total Nitrogen ($N_2$) and Argon (Ar) [b] | 100 μmol/mol (100 ppm) |
| Carbon dioxide ($CO_2$) | 2 μmol/mol (2.0 ppm) |
| Carbon monoxide (CO) | 0.2 μmol/mol (0.2 ppm) |
| Total sulfur compounds [c] ($H_2S$ basis) | 0.004 μmol/mol |
| Formaldehyde (HCHO) | 0.01 μmol/mol |
| Formic acid (HCOOH) | 0.2 μmol/mol |
| Ammonia ($NH_3$) | 0.1 μmol/mol |
| Total halogenated compounds [d] (Halogenate ion basis) | 0.05 μmol/mol |
| Maximum particulates concentration | 1 mg/kg |

NOTE:
For the constituents that are additive, such as total hydrocarbons and total sulfur compounds, the sum of the constituents are to be less than or equal to the acceptable limit. The tolerances in the applicable gas testing method are to be the tolerance of the acceptable limit.
[a] The hydrogen fuel index is determined by subtracting the "total non-hydrogen gases" in this table, expressed in mole percent, from 100 mole percent.
[b] Total hydrocarbons include oxygenated organic species. Total hydrocarbons are measured on a carbon basis (μmolC/mol). Total hydrocarbons may exceed 2 μmol/mol due only to the presence of methane, in which case the summation of methane, nitrogen, and argon is not to exceed 100 ppm.
[c] As a minimum, includes H2S, COS, CS2 and mercaptans, which are typically found in natural gas.
[d] Includes, for example, hydrogen bromide (HBr), hydrogen chloride (HCl), chlorine (Cl2), and organic halides (R-X)

Other examples of high hydrogen purity specifications are

| $H_2$ Purity Grades | $H_2$, % | non-$H_2$, ppm |
|---|---|---|
| Combustion Engine[1] | 98.000 | 20,000 |
| Fuel Cell[2] | 99.970 | 300 |
| Rocket fuel & Electronic[3] | 99.999 | 10 |

[1]International Organization for Standardization (ISO)14687:2019
[2]Hydrogen Fuel Quality Specifications for Polymer Electrolyte Fuel Cells in Road Vehicles, Department of Energy, Energy Efficiency & Renewable Energy, Fuel Cells Technologies Office, Nov. 2, 2016
[3]Hydrogen Diverse supply offers for many industries and applications, Air Liquide, 2022

When necessary to meet those specifications, the $H_2$-rich stream from membrane separator means 2 can be subjected to an additional process step to remove or convert the CO therein to $CO_2$. An additional advantage of using this possibly a trace amounts of $CH_4$, $N_2$ and $H_2O$. Stream 261 can comprise at least about 98.0%, at least about 99.0%, at least about 99.90%, at least about 99.95%, at least about 99.995% or at least about 99.999% $H_2$. Recycle $H_2$ enrichment tail gas stream 260 is fed to the retentate CO-rich stream 3 from separator 2. PSA processes typically feed tail gas as fuel, for example, to a steam methane reformer, or make use of an additional process to treat the tail gas with an adsorbent in an additional PSA unit or solvent absorbent such as dimethylethanolamine to remove $CO_2$ therefrom. By combining the tail gas recycle stream 260 with the retentate CO-rich stream 3 in accordance with the present invention, it is possible to form an oxyfuel gas turbine fuel stream 4 that can accomplish minimal or even very near zero carbon emission hydrogen production. By way of non-limiting illustrative example, this can enable at least about 90%, or at least about 95%, or at least about 99% $CO_2$ capture in the combusted oxyfuel after water knockout and a virtual zero $CO_2$ emission concentration of less than about 30 ppmv (parts per million volume), less than about 20 ppmv, less than about 15 ppmv, or less than about 10 ppmv in the high purity hydrogen product stream 261.

EXAMPLES

Below are Nonlimiting Illustrative Examples

Example 1 separation membranes and have supplied membranes globally to industry for many years.

$H_2$ and CO permeability values versus temperature are presented in Table 1 and $H_2$ and $CO_2$ permeability values are presented in Table 2. The GPU unit, also known as permeance, is a pressure normalized steady state flux for a given membrane thickness and is given as volumetric flow per unit area per second per unit differential pressure across the membrane. The Barrer unit, also known as permeability, is a steady state flux normalized for both membrane thickness and pressure differential across the membrane and is given as volumetric flow times membrane thickness, per unit area per second per unit differential pressure across the

TABLE 1

UBE Industries, Ltd., Polyimide Membrane $H_2$ and CO Permeability and Selectivity vs. Temperature Data

| $1000T^{-1}$ $(K)^{-1}$ | | | selectivity | $GPU^1$ | $GPU^1$ | $GPU^2$ | $GPU^2$ | $Barrer^3$ | $Barrer^3$ |
|---|---|---|---|---|---|---|---|---|---|
| ° F. | x | ° C. | $H_2/CO$ | $H_2$ | CO | $H_2 \times 10^{-6}$ | CO $\times 10^{-6}$ | $H_2$ $(\times 10^{-10})$ | CO $(\times 10^{-10})$ |
| 77.91 | 3.35 | 25.51 | 134.78 | 0.31 | 0.002 | 4.135 | 0.031 | 4.135 | 0.0307 |
| 140.60 | 3.00 | 60.33 | 100.00 | 0.80 | 0.008 | 10.671 | 0.107 | 10.671 | 0.1067 |
| 207.27 | 2.70 | 97.37 | 75.95 | 1.80 | 0.024 | 24.010 | 0.316 | 24.010 | 0.3161 |
| 260.60 | 2.50 | 127.00 | 65.00 | 2.60 | 0.040 | 34.681 | 0.534 | 34.681 | 0.5336 |
| 212.00 | 2.68 | 100.00 | 74.88 | UBE membrane maximum operating temperature is 100° C. | | | | | |

[1]P/I $(mm^3/s/m^2/Pa)$ Selectivity for 100° C. calculated by equation
[2]P/I $(cm^3/s/cm^2/cm\ Hg)$
[3]P $(cm^3 - cm)/s/cm^2/cm\ Hg)$ when I = 0.0001 cm membrane thickness Source: Polyimide Membranes-Applications, Fabrication, and Properties by Haruhiko Ohya, Vladislav V. Kudryavtsev and Svetlana I. Semenova (Jan. 30, 1997) page 250 Gordan and Breach Science Publishers S. A., Emmaplein 5, 1075AW Amsterdam, The Netherlands Pg. 250, FIG. 6.7, Temperature of pure gas permeation rates through asymmetric polyimide hollow fiber membrane . . . by UBE Industries, Ltd. (From Haraya, K. et al., Gas Separation and Purification, 1, 4 (1987))

membrane. Selectivity is the ratio of the respective GPU or Barrer units, e.g., $H_2/CO$ selectivity at 97.37° C. of 75.95 is determined by following ratio:

24.1010 $cm^3/cm^2/s/cm\ Hg$ divided by
0.316$^3/cm^2/s/cm\ Hg$=75.95

It can be seen from the Tables 1 and 2 that $H_2/CO$ selectivity is more sensitive to temperature change than $H_2/CO_2$ selec-

TABLE 2

UBE Industries, Ltd., Polyimide Membrane $H_2$ and $CO_2$ Permeability and Selectivity vs. Temperature Data

| $1000T^{-1}$ $(K)^{-1}$ | | | selectivity | $GPU^1$ | $GPU^1$ | $GPU^2$ | $GPU^2$ | $Barrer^3$ | $Barrer^3$ |
|---|---|---|---|---|---|---|---|---|---|
| ° F. | x | ° C. | $H_2/CO$ | $H_2$ | $CO_2$ | $H_2 \times 10^{-6}$ | $CO_2 \times 10^{-6}$ | $H_2$ $(\times 10^{-10})$ | $CO_2$ $(\times 10^{-10})$ |
| 77.91 | 3.35 | 25.51 | 6.89 | 0.31 | 0.045 | 4.135 | 0.600 | 4.135 | 0.6003 |
| 140.60 | 3.00 | 60.33 | 8.00 | 0.80 | 0.100 | 10.671 | 1.334 | 10.671 | 1.3339 |
| 207.27 | 2.70 | 97.37 | 8.82 | 1.80 | 0.204 | 24.010 | 2.721 | 24.010 | 2.7212 |
| 260.60 | 2.50 | 127.00 | 9.29 | 2.60 | 0.280 | 34.681 | 3.735 | 34.681 | 3.7349 |
| 212.00 | 2.68 | 100.00 | 9.97 | UBE membrane maximum operating temperature is 100° C. | | | | | |

[1]P/I $(mm^3/s/m^2/Pa)$ Selectivity for 100° C. calculated by equation
[2]P/I $(cm^3/s/cm^2/cm\ Hg)$
[3]P $(cm^3 - cm)/s/cm^2/cm\ Hg)$ when I = 0.0001 cm membranw thickness Source: Polyimide Membranes-Applications, Fabrication, and Properties by Haruhiko Ohya, Vladislav V. Kudryavtsev and Svetlana I. Semenova (Jan. 30, 1997) page 250 Gordan and Breach Science Publishers S. A., Emmaplein 5, 1075AW Amsterdam, The Netherlands, Pg. 250, FIG. 6.7, Temperature of pure gas permeation rates through asymmetric polyimide hollow fiber membrane . . . by UBE Industries, Ltd. (From Haraya, K. et al., Gas Separation and Purification, 1, 4 (1987))

In Tables 1 and 2, UBE Industries, Ltd. (UBE) is a Japanese multinational manufacturer of polyimide hydrogen tivity. The maximum operating temperature for the UBE polyimide membrane is 150° C. Operating an UBE polyimide membrane separator means at the maximum temperature of 150° C. increases overall system thermal efficiency. Further, the trendline equation in Table 3 calculates a $H_2/CO$ selectivity of 63.33 at 150° C., a selectivity reduction of only 2.6% compared with 127° C. Furthermore, based a trendline algorithm for temperature vs. $H_2$ GPU values in Table 3, $H_2$ GPU is increased by about 30% at 150° C. compared with 127° C. In general, mixed gas selectivity will be lower than pure gas selectivity.

Example 2

TABLE 3

SRI International, Polybenzimidazole (PBI) Membrane $H_2$, CO and $CO_2$ mixed gas Permeability and Selectivity vs. Temperature Data

| °F. | °C. | selectivity $H_2/CO$ | GPU[1] $H_2 \times 10^{-6}$ | GPU[1] CO $\times 10^{-6}$ | Barrer[2] $H_2 (\times 10^{-10})$ | Barrer[2] CO $(\times 10^{-10})$ |
|---|---|---|---|---|---|---|
| 437.00 | 225.00 | 103.0 | 80.0 | 0.775 | 80.0 | 0.775 |

[1]P/I ($cm^3/s/cm^2/cm$ Hg)
[2]P ($cm^3 - cm$)/s/$cm^2$/cm Hg) when I = 0.0001 cm membrane thickness

| °F. | °C. | selectivity $H_2/CO2$ | GPU[1] $H_2 \times 10^{-6}$ | GPU[1] $CO_2 \times 10^{-6}$ | Barrer[2] $H_2 (\times 10^{-10})$ | Barrer[2] $CO_2 (\times 10^{-10})$ |
|---|---|---|---|---|---|---|
| 437.00 | 225.00 | 40.0 | 80.0 | 2.00 | 80.0 | 2.00 |

[1]P/I ($cm^3/s/cm^2/cm$ Hg)
[2]P ($cm^3 \times cm$)/s/$cm^2$/cm Hg) when I = 0.0001 cm membrane thickness PBI DATA:
The PBI data in Table 3 is available at: https://www.netl.doe.gov/sites/default/files/2017-12/2I-S-Jayaweera2-SRI-PBI-Hollow-Fiber-Membranes.pdf Example 3

Non-limiting examples of mixed gas selectivity concentrations of the first separated CO-rich stream and the second separated Hz-rich stream achieved by the Ube membrane and the Generon® membrane.

| Ube membrane | $CO_2$ conc. | CO conc. | $CH_4$ conc. | $Ar/N_2$ conc. | $H_2$ conc. | $H_2S$ conc. | $H_2O$ conc. |
|---|---|---|---|---|---|---|---|
| Cooled syngas Feed, 20° C. | 2.88% | 23.98% | 0.96% | 0.20% | 71.93% | 0.00% | 0.05% |
| First CO-rich stream, 20° C. | 3.82% | 56.80% | 2.38% | 0.48% | 36.52% | 0.00% | 0.00% |
| Second $H_2$-rich stream, 20° C. | 2.26% | 2.25% | 0.02% | 0.02% | 95.37% | 0.00% | 0.08% |
| Cooled syngas Feed, 30° C. | 2.88% | 23.97% | 0.96% | 0.20% | 71.90% | 0.00% | 0.09% |
| First CO-rich stream, 30° C. | 3.86% | 67.06% | 2.88% | 0.57% | 25.63% | 0.00% | 0.00% |
| Second $H_2$-rich stream, 30° C. | 2.41% | 3.19% | 0.04% | 0.02% | 94.21% | 0.00% | 0.13% |
| Cooled syngas Feed, 40° C. | 2.88% | 23.96% | 0.96% | 0.20% | 71.88% | 0.00% | 0.12% |
| First CO-rich stream, 40° C. | 3.83% | 64.90% | 2.84% | 0.56% | 27.87% | 0.00% | 0.01% |
| Second $H_2$-rich stream, 40° C. | 2.41% | 4.09% | 0.05% | 0.02% | 93.25% | 0.00% | 0.17% |
| Cooled syngas Feed, 50° C. | 2.87% | 23.92% | 0.96% | 0.20% | 71.76% | 0.00% | 0.29% |
| First CO-rich stream, 50° C. | 4.04% | 70.87% | 3.14% | 0.61% | 21.33% | 0.00% | 0.01% |
| Second $H_2$-rich stream, 50° C. | 2.39% | 4.55% | 0.06% | 0.03% | 92.56% | 0.00% | 0.41% |

| Generon membrane | $CO_2$ conc. | CO conc. | $CH_4$ conc. | $Ar/N_2$ conc. | $H_2$ conc. | $H_2S$ conc. | $H_2O$ conc. |
|---|---|---|---|---|---|---|---|
| Cooled syngas Feed, 38° C. | 2.87% | 23.99% | 0.97% | 0.19% | 71.97% | 0.00% | 0.01% |
| First CO-rich stream, 38° C. | 2.93% | 89.53% | 3.88% | 0.76% | 2.90% | 0.00% | 0.00% |
| Second $H_2$-rich stream, 38° C. | 2.85% | 5.42% | 0.15% | 0.03% | 91.54% | 0.00% | 0.01% |
| Cooled syngas Feed, 38° C. | 2.87% | 23.99% | 0.97% | 0.19% | 71.97% | 0.00% | 0.01% |
| First CO-rich stream, 38° C. | 3.02% | 73.49% | 2.93% | 0.58% | 19.98% | 0.00% | 0.00% |
| Second $H_2$-rich stream, 38° C. | 2.81% | 3.26% | 0.15% | 0.03% | 93.74% | 0.00% | 0.13% |
| Cooled syngas Feed, 38° C. | 2.87% | 23.99% | 0.97% | 0.19% | 71.97% | 0.00% | 0.01% |
| First CO-rich stream, 38° C. | 3.28% | 67.29% | 2.69% | 0.53% | 26.21% | 0.00% | 0.00% |
| Second $H_2$-rich stream, 38° C. | 2.67% | 2.83% | 0.13% | 0.02% | 94.34% | 0.00% | 0.01% |
| Cooled syngas Feed, 57° C. | 2.87% | 23.99% | 0.97% | 0.19% | 71.97% | 0.00% | 0.01% |
| First CO-rich stream, 57° C. | 3.74% | 59.84% | 2.51% | 0.49% | 33.42% | 0.00% | 0.00% |
| Second $H_2$-rich stream, 57° C. | 2.38% | 3.69% | 0.10% | 0.02% | 93.79% | 0.00% | 0.02% |

Example 4

The present inventor initiated a study to compare membrane performance of an Ube commercial membrane (at 40° C.) and a Generon® commercial membrane (at 38° C.) in separating a syngas. The mixed gas selectivity of these membranes was compared for mixed gas $H_2/CO_2$ (shifted syngas) vs. mixed gas $H_2/CO$ separations (unshifted syngas).

Membrane Performance Comparison on Unshifted and Shifted Syngas $H_2/CO$ mixed gas selectivity in the Ube and Generon commercial gas separation membranes for separating unshifted syngas is substantially higher than their $H_2/CO_2$ mixed gas selectivity for separating shifted syngas. The increase in mixed gas selectivity is greater by more than an order of magnitude, enabling higher recoveries and purities in unshifted syngas for the respective separated gases.

As an example, for a given unshifted syngas feed composition, the Ube membrane recovers 87.3% of the $H_2$ at 93.3% purity in the permeate and 88.5% of the CO at 64.9% purity in the retentate. In contrast, for a given shifted syngas feed composition, the Ube membrane recovers 89.2% of the $H_2$ at 82.8% purity in the permeate and 45.1% of the $CO_2$ at 52.2% purity in the retentate.

As another example, for a given unshifted syngas feed composition, the Generon® membrane recovers 91.8% of the $H_2$ at 93.7% purity in the permeate and 90.4% of the CO at 73.5% purity in the retentate. In contrast, for a given shifted syngas feed composition, the Generon® membrane recovers 91.8% of the $H_2$ at 79.1% purity in the permeate and 28.1% of the $CO_2$ at 45.9% purity in the retentate. The above comparisons are presented in the table below:

|  | Retentate | | Permeate | |
| --- | --- | --- | --- | --- |
|  | $H_2$ rec. | $H_2$ purity | CO rec. | CO purity |
| Ube unshifted syngas | 87.3% | 93.3% | 88.5% | 64.9% |
| Generon ® unshifted syngas | 91.8% | 93.7% | 90.4% | 73.5% |

|  | $H_2$ rec. | $H_2$ purity | $CO_2$ rec. | $CO_2$ purity |
| --- | --- | --- | --- | --- |
| Ube shifted syngas | 89.2% | 82.8% | 45.1% | 52.2% |
| Generon ® shifted syngas | 91.8% | 79.1% | 28.1% | 45.9% |

The recoveries and purities of the separated $CO_2$ from shifted syngas is substantially lower than the recoveries and purities of the separated CO from unshifted syngas.

Example 6

Mass and Energy Balance with Water Gas Shift Reaction

The following data is based on use of a Generon® membrane operated at 38.7° C. with a $H_2/CO$ selectivity of 34.1.

Figure 3:
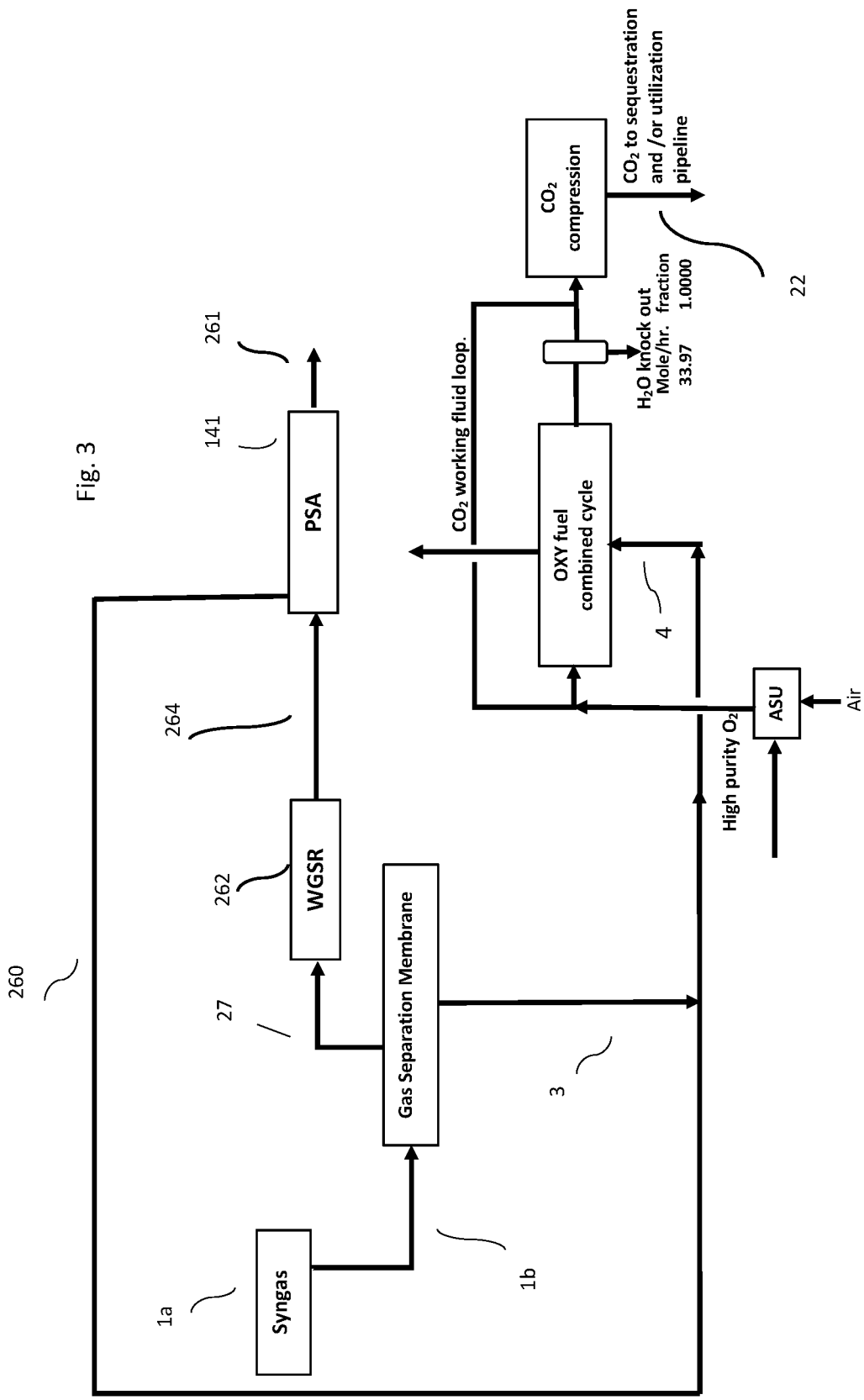
FIG. 3 is a block diagram according to an embodiment for material balance purposes.

The numbers on the left refer to the reference numbers in FIG. 3.

| | | Syngas: | |
| --- | --- | --- | --- |
| | | | mole/hr. |
| 1b | CO | | 2399 |
| | $CO_2$ | | 287 |
| | $H_2$ | | 7197 |
| | $N_2$ | | 19 |
| | $CH_4$ | | 97 |
| | $H_2O$ | | 1 |
| | | | 10000 |

| | | $H_2$ rich permeate: | |
| --- | --- | --- | --- |
| | | | mole/hr. |
| 27 | CO | | 230 |
| | $CO_2$ | | 198 |
| | $H_2$ | | 6607 |
| | $N_2$ | | 002 |
| | $CH_4$ | | 010 |
| | $H_2O$ | | 001 |
| | | | 7048 |

| | | Shifted $H_2$ rich permeate: | |
| --- | --- | --- | --- |
| | | mole/hr. | fraction |
| 264 | CO | 7 | 0.0005 |
| | $CO_2$ | 421 | 0.0305 |
| | $H_2$ | 13359 | 0.9680 |
| | $N_2$ | 2 | 0.0001 |
| | $CH_4$ | 100 | 0.0008 |
| | $H_2O$ | 1 | 0.0001 |
| | | 13890 | 1.0000 |

| | | PSA Product | |
| --- | --- | --- | --- |
| | | mole/hr. | fraction |
| 261 | CO | 0.00 | 0.000000153 |
| | $CO_2$ | 0.00 | 0.000009543 |
| | $H_2$ | 10554 | 0.999990000 |
| | $N_2$ | 0.00 | 0.000000045 |
| | $CH_4$ | 0.00 | 0.000000236 |
| | $H_2O$ | 0.00 | 0.000000023 |
| | | 10554 | 1.000000000 |

| | | Tail Gas recycle: | |
| --- | --- | --- | --- |
| | | | fraction |
| 260 | CO | 6.7 | 0.0021 |
| | $CO_2$ | 420.7 | 0.1296 |
| | $H_2$ | 2805.4 | 0.8642 |
| | $N_2$ | 2.0 | 0.0006 |
| | $CH_4$ | 10.4 | 0.0032 |
| | $H_2O$ | 1.0 | 0.0003 |
| | | 3246.2 | 1.0000 |

| | | Combined fuel from, CO-rich retentate stream 3 and tail gas recycle 260 | |
|---|---|---|---|
| | | mole/hr. | fraction |
| 4 | CO | 2175.9 | 0.3510 |
| | $CO_2$ | 510.0 | 0.0823 |
| | $H_2$ | 3395.6 | 0.5478 |
| | $N_2$ | 19.0 | 0.0031 |
| | $CH_4$ | 97.0 | 0.0156 |
| | $H_2O$ | 001.0 | 0.0002 |
| | | 6198.4 | 1.0000 |

| | | $CO_2$ to sequestration or pipeline for use Combusted fuel after water K/O | |
|---|---|---|---|
| | | mole/hr. | fraction |
| 22 | CO | 0.000 | 0.0000 |
| | $CO_2$ | 2782.9 | 0.9932 |
| | $H_2$ | 0.000 | 0.0000 |
| | $N_2$ | 19.0 | 0.0068 |
| | $CH_4$ | 0.000 | 0.0000 |
| | $H_2O$ | 0.000 | 0.0000 |
| | | 2801.9 | 1.0000 |

Example 7

Mass and Energy Balance without Water Gas Shift Reaction

The following data is based on use of a Generon® membrane operated at 38.7° C. with a $H_2$/CO selectivity of 34.1.

The numbers on the left refer to the reference numbers in FIG. 4.

| | | Syngas: | |
|---|---|---|---|
| | | mole/hr. | |
| 1b | CO | 2399 | |
| | $CO_2$ | 287 | |
| | $H_2$ | 7197 | |
| | $N_2$ | 19 | |
| | $CH_4$ | 97 | |
| | $H_2O$ | 1 | |
| | | 10000.00 | |

| | | $H_2$ rich permeate: | |
|---|---|---|---|
| | | mole/hr. | |
| 27 | CO | 229.8242 | |
| | $CO_2$ | 197.7430 | |
| | $H_2$ | 6606.8460 | |
| | $N_2$ | 01.9969 | |
| | $CH_4$ | 10.4275 | |
| | $H_2O$ | 0.010000 | |
| | | 7047.8376 | |

| | | $H_2$ production: | |
|---|---|---|---|
| | | Mole/hr. | fraction |
| 261 | CO | 0.0272 | 0.000005212 |
| | $CO_2$ | 0.0234 | 0.000004484 |
| | $H_2$ | 5219.4083 | 0.999990000 |
| | $N_2$ | 0.0002 | 0.000000045 |
| | $CH_4$ | 0.0012 | 0.000000236 |
| | $H_2O$ | 0.0001 | 0.000000023 |
| | | 5219.5605 | 1.000000000 |

| | | Tail gas recycle: | |
|---|---|---|---|
| | | Mole/hr. | fraction |
| 260 | CO | 229.7970 | 0.125684 |
| | $CO_2$ | 197.7196 | 0.108139 |
| | $H_2$ | 1387.4377 | 0.758836 |
| | $N_2$ | 1.9967 | 0.001092 |
| | $CH_4$ | 10.4236 | 0.005702 |
| | $H_2O$ | 0.9999 | 0.000547 |
| | | 1828.3771 | 1.000000 |

| | | Combined fuel from, CO-rich retentate stream 3 and tail gas recycle stream 260: | |
|---|---|---|---|
| | | mole/hr. | Fraction |
| 4 | CO | 2398.9728 | 0.501821 |
| | $CO_2$ | 286.9766 | 0.060030 |
| | $H_2$ | 1977.5917 | 0.413675 |
| | $N_2$ | 18.9998 | 0.003974 |
| | $CH_4$ | 96.9988 | 0.020290 |
| | $H_2O$ | 0.9999 | 0.000209 |
| | | 4780.5395 | 1.000000 |

| | | Combusted fuel after water K/O: | |
|---|---|---|---|
| | | mole/hr. | Fraction |
| 22 | CO | 0.000000 | 0.000000 |
| | $CO_2$ | 2782.9482 | 0.993219 |
| | $H_2$ | 0.000000 | 0.000000 |
| | $N_2$ | 18.9998 | 0.006781 |
| | $CH_4$ | 0.000000 | 0.000000 |
| | $H_2O$ | 0.000000 | 0.000000 |
| | | 2801.9479 | 1.000000 |

PSA gas is typically combusted with air to generate process heat. A syngas feed of 10,000 mole/hr. gives a tail gas recycle of 3,246.3 mole/hr. Directing the tail gas to a vented combustor emits 76,718 (metric) tonne/yr. of uncaptured $CO_2$ vented to the atmosphere. As illustrated in FIGS. 2 and 3, when the PSA tail gas is combined with the Gas Separation Membrane retentate to form a combined fuel stream of 6,198.4 mole/hr. to the oxyfuel combined cycle. 100% of the carbon in the syngas feed is captured as 487,563.2 tonne/yr. of as $CO_2$ in the oxyfuel combined cycle exhaust at 99.32% purity. Some PSA systems make use of an additional process to treat the tail gas with an adsorbent in an additional PSA unit or an absorbent such as dimethylethanolamine to remove $CO_2$ therefrom. In contrast to a system which uses additional PSA or an absorbent process to further remove $CO_2$ recycling the tail gas to the membrane separator retentate stream allows for the omission of an additional PSA unit or an absorbent process. In addition, because of moving most of the CO in the tail gas to recycle, PSA requirements are substantially reduced.

What is claimed is:

1. A process comprising:
   a. feeding a separator feedstream comprising syngas from converted natural gas to membrane separator means,
   b. separating the separator feedstream in the separator means to form a first, CO-rich stream and a second, $H_2$-rich stream,
   c. feeding the first, CO-rich stream as an oxyfuel combustor feedstream to oxyfuel combustor means for forming sub-critical $CO_2$ gas turbine working fluid, and
   d. feeding the sub-critical $CO_2$ gas turbine working fluid to gas turbine means for producing power,
   e. wherein the sub-critical $CO_2$ gas turbine working fluid exits the gas turbine means as gas turbine exhaust which is fed to heat recovery steam generator means for generating steam, and wherein steam from the heat recovery steam generator means is fed as first steam working fluid to first steam turbine means for generating power,
   f. wherein a first portion of exhaust from the gas turbine means is recycled to the oxyfuel combustor means together with high purity oxygen and the CO-rich stream,
   g. wherein the second, $H_2$-rich stream is fed as a $H_2$ feedstream to pressure swing adsorption hydrogen enrichment means to form an enriched $H_2$ stream and a tail gas stream,
   h. wherein the tail gas stream is fed as tail gas recycle to the oxyfuel combustor feedstream,
   i. wherein the remaining portion of the exhaust from the gas turbine means is captured, and
   j. wherein a $H_2$ product of at least about 98% $H_2$ purity is recovered from the pressure swing adsorption hydrogen enrichment means.

2. The process of claim 1, wherein steam from the heat recovery steam generator means is fed as second steam working fluid to second steam turbine means for generating power.

3. The process of claim 2, wherein the syngas is unshifted.

4. The process of claim 1, wherein the first, CO-rich stream is a retentate stream from the membrane separator means, and wherein the tail gas recycle stream is fed to the retentate stream.

5. The process of claim 4, wherein the syngas is unshifted.

6. The process of claim 3, wherein the $H_2$-rich stream is subjected to a water gas shift reaction before being fed to the pressure swing adsorption means.

7. The process of claim 1, wherein the Hz-rich stream comprises at least 40% $H_2$, and the tail gas comprises at least about 5% $CO_2$.

8. The process of claim 7, wherein the Hz-rich stream comprises at least 50% $H_2$, the enriched $H_2$ stream comprises at least about 99% $H_2$, and the tail gas comprises at least about 8% $CO_2$.

9. The process of claim 5, wherein the $H_2$-rich stream comprises at least 60% $H_2$, the enriched $H_2$ stream comprises at least about 99.9% $H_2$, and the tail gas comprises at least about 12% $CO_2$.

10. The process of claim 6, wherein the $H_2$-rich stream comprises at least 85% $H_2$, the enriched $H_2$ stream comprises at least 99.995% $H_2$, and the tail gas comprises at least about 16% $CO_2$.

11. The process of claim 1, wherein the syngas is unshifted.

12. The process of claim 1, wherein the first, CO-rich stream is fed directly from the membrane separator means to the oxyfuel combustor means.

13. The process of claim 1, wherein the $H_2$-rich stream is subjected to a water gas shift reaction before being fed to the hydrogen enrichment means.

14. A process comprising:
   a. feeding a separator feedstream comprising syngas from converted natural gas to separator means,
   b. separating the separator feedstream in the separator means to form a first, CO-rich stream and a second, $H_2$ rich stream,
   c. feeding the first, CO-rich stream as an oxyfuel combustor feedstream to oxyfuel combustor means for forming sub-critical $CO_2$ gas turbine working fluid,
   d. feeding the sub-critical $CO_2$ gas turbine working fluid to sub-critical $CO_2$ gas turbine means, the sub-critical $CO_2$ gas turbine means having a sub-critical $CO_2$ gas turbine expansion section and a sub-critical $CO_2$ gas turbine compression section, the subcritical $CO_2$ gas turbine working fluid being fed to the sub-critical $CO_2$ gas turbine expansion section for producing power,
   e. recycling at least a first portion of exhaust from the sub-critical $CO_2$ gas turbine expansion section to the sub-critical $CO_2$ gas turbine compression section of the sub-critical $CO_2$ gas turbine means, wherein the power produced in step (d) is used to power the sub-critical $CO_2$ gas turbine compression section to compress the recycled sub-critical $CO_2$ gas turbine exhaust,
   f. capturing the remaining portion of sub-critical $CO_2$ gas turbine exhaust,
   g. feeding the compressed sub-critical $CO_2$ gas turbine exhaust to the oxyfuel combustor means,
   h. reacting the first, CO-rich stream with high purity oxygen in the oxyfuel combustor means under sub-critical $CO_2$ conditions,
   i. wherein the second, $H_2$-rich stream is fed as a $H_2$ feedstream to pressure swing adsorption hydrogen enrichment means to form an enriched $H_2$ stream and a tail gas stream,
   j. wherein a $H_2$ product of at least about 98% $H_2$ purity is recovered from the pressure swing adsorption hydrogen enrichment means and
   k. wherein the tail gas stream is fed as tail gas recycle to the oxyfuel combustor feedstream.

15. The process of claim 14, wherein the syngas is unshifted.

16. A process comprising:
   a. feeding a separator feedstream comprising syngas from converted natural gas to a membrane separator,
   b. separating the separator feedstream in the separator to form a first, CO-rich stream and a second, $H_2$-rich stream,
   c. feeding the first, CO-rich stream as an oxyfuel combustor feedstream to an oxyfuel combustor for forming sub-critical $CO_2$ gas turbine working fluid, and
   d. feeding the sub-critical $CO_2$ gas turbine working fluid to a gas turbine for producing power,
   e. wherein the sub-critical $CO_2$ gas turbine working fluid exits the gas turbine as gas turbine exhaust which is fed to a heat recovery steam generator for generating steam, and wherein steam from the heat recovery steam generator is fed as first steam working fluid to a first steam turbine for generating power, f. wherein a first portion of exhaust from the gas turbine is recycled to the oxyfuel combustor together with high purity oxygen and the CO-rich stream, g. wherein the remaining portion of exhaust from the gas turbine is captured, h. wherein the second, $H_2$-rich stream is fed as a $H_2$ feedstream to pressure swing adsorption hydrogen enrichment to form an enriched Hz stream and a tail gas stream, i. wherein a $H_2$ product of at least about 98% $H_2$ purity is recovered from the pressure swing adsorption hydrogen enrichment means and j. wherein the tail gas stream is fed as tail gas recycle to the oxyfuel combustor feedstream.

17. The process of claim 16, wherein the first, CO-rich stream is a retentate stream from the membrane separator, and wherein the tail gas recycle stream is fed to the retentate stream.

18. The process of claim 16, wherein the first, CO-rich stream is fed directly from the separator to the oxyfuel combustor.

19. The process of claim 16, wherein the syngas is unshifted.

* * * * *